United States Patent

Iwamoto et al.

(10) Patent No.: US 11,409,958 B2
(45) Date of Patent: Aug. 9, 2022

(54) POLAR WORD EMBEDDING

(71) Applicant: INTERNATIONAL BUSINESS MACHINES CORPORATION, Armonk, NY (US)

(72) Inventors: Ran Iwamoto, Yokohama (JP); Ryosuke Kohita, Tokyo (JP); Akifumi Wachi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

(21) Appl. No.: 17/032,690

(22) Filed: Sep. 25, 2020

(65) Prior Publication Data

US 2022/0100956 A1 Mar. 31, 2022

(51) Int. Cl.
*G06F 40/237* (2020.01)
*G06F 40/274* (2020.01)
*G06F 40/30* (2020.01)
*G06F 40/226* (2020.01)
*G06F 40/284* (2020.01)

(52) U.S. Cl.
CPC .......... *G06F 40/237* (2020.01); *G06F 40/226* (2020.01); *G06F 40/284* (2020.01)

(58) Field of Classification Search
CPC .... G06F 40/237; G06F 40/242; G06F 40/279; G06F 40/274; G06F 40/30
USPC ................. 704/1, 9, 10; 706/16, 19, 20, 55
See application file for complete search history.

(56) References Cited

U.S. PATENT DOCUMENTS

| | | | |
|---|---|---|---|
| 10,482,183 B1* | 11/2019 | Vargas | G06F 40/30 |
| 2016/0239739 A1* | 8/2016 | Das | G06F 40/30 |
| 2017/0004208 A1 | 1/2017 | Podder et al. | |
| 2018/0157644 A1* | 6/2018 | Mandt | G06F 40/284 |
| 2019/0370337 A1* | 12/2019 | Lee | G06F 40/30 |
| 2020/0293902 A1* | 9/2020 | Li | G06F 40/30 |
| 2021/0004439 A1* | 1/2021 | Xiong | G06F 40/284 |
| 2021/0133279 A1* | 5/2021 | Shirani | G06F 40/279 |

OTHER PUBLICATIONS

Wikipedia, Spherical coordinate system, 16 Pages, downloaded Feb. 1, 2022. (Year: 2022).*

Dennis et al., "Techniques for nonlinear least squares and robust regression", Communications in Statistics—Simulation and Computation, B7(4), pp. 345-359 (1978) (Year: 1978).*

Jonathan T. Barron, "A General and Adaptive Robust Loss Function", Proceedings of the IEEE/CVF Conference on Computer Vision and Pattern Recognition (CVPR), 2019, pp. 4331-4339 (Year: 2019).*

(Continued)

*Primary Examiner* — Martin Lerner
(74) *Attorney, Agent, or Firm* — Tutunjian & Bitetto, P.C.; Randall Bluestone

(57) ABSTRACT

Methods and systems for performing a language processing task include setting an angular coordinate for a vector representation of each of a set of words, based on similarity of the words to one another. A radial coordinate is set for the vector representation of each word, according to hierarchical relationships between the words. A language processing task is performed based on hierarchical word relationships using the vector representations of the words.

18 Claims, 5 Drawing Sheets

(56) References Cited

OTHER PUBLICATIONS

Wang et al., "Robust Adaptive Estimation of Graph Signals Based on Welsch Loss", Feb. 2022, Symmetry 14(2):426, 24 Pages. (Year: 2022).*

Iwamoto et al., "Polar Embedding", Proceedings of the 25th Conference on Computational Natural Language Learning (CoNLL), pp. 470-480, Nov. 10-11, 2021. (Year: 2021).*

Mathew et al., "The POLAR Framework: Polar Opposites Enable Interpretability of Pre-TrainedWord Embeddings", arXiv:2001.09876V2 [cs.CL]. Jan. 28, 2020. pp. 1-11.

Meng et al., "Spherical Text Embedding", arXiv:1911.01196v1 [cs.CL], Nov. 4, 2019. pp. 1-15.

Nguyen et al. "Hierarchical Embeddings for Hypernymy Detection and Directionality", Proceedings of the 2017 Conference on Empirical Methods in Natural Language Processing. Sep. 7-11, 2017. pp. 233-243.

Nickel et al., "Poincaré Embeddings for Learning Hierarchical Representations", 31st Conference on Neural Information Processing Systems (NIPS 2017). Dec. 4-9, 2017. pp. 1-10.

Vendrov et al., "Order-Embeddings of Images and Language", arXiv:1511.06361v6 [cs.LG] Mar. 1, 2016. pp. 1-12.

Wilson et al., "Spherical and Hyperbolic Embeddings of Data", IEEE Transactions of Pattern Analysis and Machine Intelligence, Apr. 11, 2014. vol. 36, No. 11. pp. 1-14.

Zhang et al., "Learning Hierarchy-Aware Knowledge Graph Embeddings for Link Prediction", arXiv:1911.09419v2 [cs.LG]. Dec. 25, 2019. pp. 1-10.

\* cited by examiner

POLAR WORD EMBEDDING

BACKGROUND

The present invention generally relates to embeddings of words in a latent space, and, more particularly, to a hierarchical embedding that preserves hierarchical relationships between words.

Word embeddings are used in a wide variety of applications. They provide a way to compare different words using mathematical tools. For example, a word embedding may translate a word into a vector in a latent space. The vectors of different words can then be compared, with similar vectors representing words that have similar meanings.

SUMMARY

A method for performing a language processing task includes setting an angular coordinate for a vector representation of each of a set of words, based on similarity of the words to one another. A radial coordinate is set for the vector representation of each word, according to hierarchical relationships between the words. A language processing task is performed based on hierarchical word relationships using the vector representations of the words.

A system for performing a language processing task includes a hardware processor and a memory, configured to store a computer program product. When executed by the hardware processor, the computer program product implements polar word embedding code and a word embedding task. The polar word embedding code sets an angular coordinate for a vector representation of each word of a plurality of words, based on similarity of the plurality of words to one another, and to set a radial coordinate for the vector representation of each word in the plurality of words, according to hierarchical relationships between the words. The language processing task is based on hierarchical word relationships using the vector representations of the plurality of words.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide word embeddings that not only capture similarities between word meanings, but also capture hierarchical relationships between words. Toward this end, the present embodiments use polar coordinates, with the radius of a particular embedded vector representing a degree of abstraction. This hierarchical information can be used in a variety of applications, such as in question-answering systems, taxonomy construction, text generation, and natural language processing.

The hierarchical relationship between two words can be described as a hypernym-hyponym relation, and can be characterized as an "is a" relationship. Thus, an eagle "is a" bird, and a mouse "is a" mammal. In these examples, the more general term (e.g., "bird," and, "mammal") is the hypernym, and the more specific term (e.g., "eagle," and, "mouse") is the hyponym. Such relations can be extracted using, e.g., pattern-based processes and word co-occurrence statistics.

The present embodiments may train an embedding system with polar coordinates in a low-dimensional Euclidean space to represent word hierarchies explicitly. Angle vectors may be trained using, e.g., a Welsch loss function, which prevents words from being clustered at the sphere's pole. The use of polar coordinates makes it simple to convert to Cartesian coordinates, keeping the semantic information obtained by training. Word embedding with hierarchical relations, using polar coordinates, outperforms other embedding models in both hyperbolic space and Euclidean space. A metric can be used to measure word similarity, with or without considering the influence of word hierarchies.

Although the present embodiments are described with a particular focus on word embedding, it should be understood that the present principles can be applied to any embedding task that captures hierarchical information. For example, the present embodiments may be employed for link prediction tasks, which use graphs as inputs, and which attempt to determine whether a link exists between two nodes in a graph. Hierarchical information is particularly useful for link prediction in the context of directed, acyclic graphs, for example. Taking a tree graph structure as a specific example, with a clear hierarchy between the root and leaf nodes, maintaining the hierarchy information in the embedding preserves significant information that would otherwise be lost.

Figure 1:
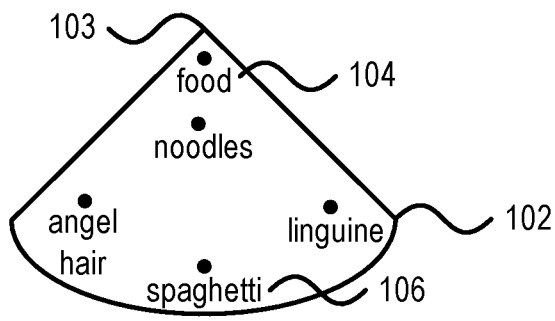
FIG. 1 is a diagram of hierarchical word embeddings in polar coordinates in a Euclidean space, in accordance with an embodiment of the present invention.

Referring now to FIG. 1, an exemplary polar word embedding is shown. A portion of the latent space 102 is shown, with coordinates defined by a radius component (distance from origin 103) and an angular component. Each word shown is associated with a particular point, having respective coordinates (r, θ). Larger values of r represent greater degrees of specificity, while being within a given angular range indicates similarity of meaning. For example, a hypernym 104 is shown as "food," with a variety of hyponyms 106, including "noodles." There are words that are even more specific than "noodles," and thus have even greater radius, including "linguine," "spaghetti," and, "angel hair." The angular closeness that is shown indicates, for example, that "angel hair" is more similar to "spaghetti" than it is to "linguine."

In some embodiments, the angular similarity between two vectors can be measured using the cosine distance. In some embodiments, a similarity metric that considers word hierarchy can be the Kullback-Leibler divergence or the expected likelihood kernel. The Kullback-Leibler divergence can keep the distribution of angles uniform, to leverage the small latent space efficiently. However, because a uniform distribution can be difficult to express in polar coordinates as a formula, the uniform distribution can be approximated in polar coordinates with Gaussian Mixture Models (GMMs), the angle values can be updated to be closer to the approximated uniform distribution with a gradient-based approach, such as a Stein Variational Gradient Descent (SVGD).

Although this example is shown in a two-dimensional plane, it should be understood that the present embodiments may also be implemented in three or more dimensions, with additional angular components to the resulting vectors. Thus, for example, in n-dimensional space, a word may be characterized with the coordinates $(r, \theta, \varphi_i)$, with $\varphi_i$ representing additional angular coordinates. The coordinate $\theta$ may occupy the range $\theta \in [0, 2\pi)$, while the coordinates coordinate $\varphi_i$ may occupy the range $\varphi_i \in (0, \pi)$, where $i=1, 2, \ldots, n-2$.

Thus, a word w may be represented as a vector $w=(r, \theta, \varphi_i)$ in $W^n = \{w \in \mathbb{R}^n | \|w\| < r_{max}\}$, where $r \in (0, r_{max})$, $\theta \in [0, 2\pi)$, $\varphi_i \in (0, \pi)$, $i=1,2,\ldots, n-2$ and where $\|\cdot\|$ is the Euclidean norm. The value $r_{max}$ represents a maximum radius value, and may be set to any appropriate value, such as 1. The value for the radius may be obtained according to tree-depth in a database of semantic relations, such as the WordNet database, may be learned from a text corpus, or may be obtained by any other appropriate process. Word similarity may be learned from relation pairs in a database of semantic relations, from word co-occurrence statistics, or from any other appropriate source. The norm can be used to identify hypernym/hyponym relationships—if two words having similar angles have different norms, then they may be considered to have a hypernym/hyponym relationship between them.

A low-dimensional space is used. High-dimensional spaces concentrate most of their volume at the surface of a hyper-sphere, making it difficult to adequately distribute hypernyms at varying radii. For example, spaces having any number of dimensions from 2 to 10 may be used. Spaces having 2 or 3 dimensions are particularly contemplated.

The radial values and the angular values for words may be learned and updated separately. Thus, the angular values that represent word similarity can be handled without regard for hierarchy. Word vectors may be placed as uniformly as possible through the latent space. To achieve this, the initial values of angle vectors and a loss function may be set randomly, so that words are distributed uniformly. When vectors are distributed uniformly on a hyper-sphere (e.g., a sphere in the space $\mathbb{R}^n$), the variables in Cartesian coordinates follow a normal distribution. After the initial values are set, the angular values of the words can be updated to reflect their similarity to other words, as described below, maintaining the even distribution in the space.

Figure 2:
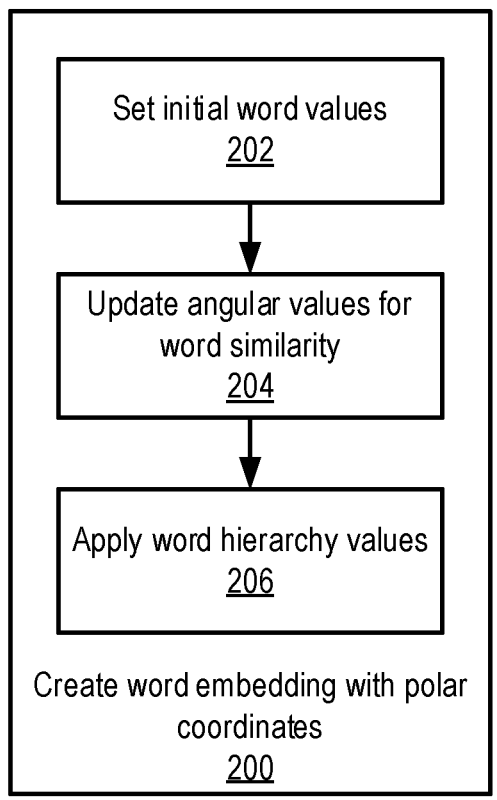
FIG. 2 is a block/flow diagram of a method for creating a word embedding that uses polar coordinates in a Euclidean space, in accordance with an embodiment of the present invention.

Referring now to FIG. 2, a method 200 for creating word embeddings with polar coordinates is shown. Block 202 sets the initial word values, as described above, for example using a random, uniform distribution across a hyper-sphere, disregarding radius (e.g., setting radius to equal one for all words). Block 204 then updates the angular values of the words according to word similarity, with words that are more similar to one another being closer to one another on the hyper-sphere. Block 206 applies word hierarchy values to the radius components of the coordinates.

Assuming that words $w_t$ and $w_c$ have similar meanings, the distance between the two words in the angular dimension $\theta$ can be described as follows:

$$d(\theta_t, \theta_c) = \min(2\pi - |\theta_t - \theta_c|, |\theta_t - \theta_c|)$$

Thus, if the angular component $\theta_t$ of the word $w_t$ is $0.2\pi$, and if the angular component $\theta_c$ of the word $w_c$ is $0.4\pi$, then block 204 adjusts $\theta_t$ to be larger and adjusts $\theta_c$ to be smaller. However, if the value of $\theta_t$ is larger than $\theta_c$, then $\theta_t$ is adjusted to be larger and $\theta_c$ is adjusted to be smaller. In other angular dimensions $\varphi_i$, the distance between the two words can be described as follows:

$$d(\varphi_t, \varphi_c) = |\varphi_t - \varphi_c|$$

The new angles for the words are determined using an appropriate loss function. The loss function may be selected to use the low-dimensional Euclidean space effectively, to provide a relatively even distribution of words across the hyper-sphere. In some embodiments, a Welsch loss function may be used. Since the gradient of the Welsch loss function does not increase linearly, it prevents words from gathering into the pole, even if negative sampling is used.

Thus, block 204 may use a combination of two loss functions: $L = L_{KL} + L_{Welsch}$, where $L_{KL}$ is the Kullback-Leibler divergence, which helps maintain the initial distribution, and where $L_{Welsch}$ is a Welsch loss function, which prevents words from accumulating at the poles. Maintaining a uniform distribution of words on the hyper-sphere facilitates identifying the similarities and differences between words. Although the present description focuses on these particular loss functions, it should be understood that any other appropriate loss function(s) may be used instead to maintain the distribution of words.

In general, the loss function may be used to optimize a set of parameters $\Theta$, using a set of positive samples of words that have semantic meanings that are relevant to one another, and a set of negative samples that are not relevant to one another. In the context of a word hierarchy graph, a positive sample may be a pair of words that are connected by an edge, while a negative sample may be a pair of words that are not connected by an edge.

The Welsch loss function can be expressed as:

$$L_{Welsch}(d) = \frac{c^2}{2}\left[1 - e^{-\frac{d^2}{2c^2}}\right]$$

where d is the angle distance of two words, and c is a parameter. The gradient can be expressed as:

$$\frac{\partial L_{Welsch}(d)}{\partial d} = \frac{d}{2}e^{-\frac{d^2}{2c^2}}$$

As is apparent from the functional form of the gradient, it does not linearly increase with increasing d, and it changes depending on c. If the parameter c is set to be 0.5, then the gradient is small when the angle difference d between two words nears 1. By adjusting the angular values of the respective words $w_t$ and $w_c$, the combined loss function L can be minimized. Block 204 can do this in an iterative fashion, for example adjusting angular values by increments for each of the words in the embedding. As the distance d between two words decreases, the gradient increases, but does not exceed a limit value (e.g., 0.5d). At large values for d, the gradient approaches 0.

The hierarchical values for block 206 may come from the structure of an input. For example, the input may be in the form of a directed, acyclic graph, that provides hypernym/hyponym relationships according to positioning within the graph. In one example, where a tree of animal taxonomy is provided as an input, the root node may be the word "mammalia," with child nodes that identify different orders of mammalia, and subsequent levels of the tree representing family, genus, and species. Each node in tree would then have an associated height and depth, which may correspond to a radius coordinate for the embedded word, with words that are closer to the root node having radius values that are closer to zero. Following the example, "mammalia" would be at or close to the origin, while individual species would be far from the origin.

Block 206 may use any appropriate mapping function to translate the hierarchy to a radius value. For example, block 206 may determine the maximum height/depth of an input tree, and linearly map these values onto the range (0,1). In some embodiments, a non-linear mapping may be used, to compensate for volumetric irregularities that may arise from high dimensionality. Because the angular positioning may be performed without regard to the hierarchical relationships between words, the radial coordinates may be set at any time in the process, whether before, during, or after the update of the angular values.

Figure 3:
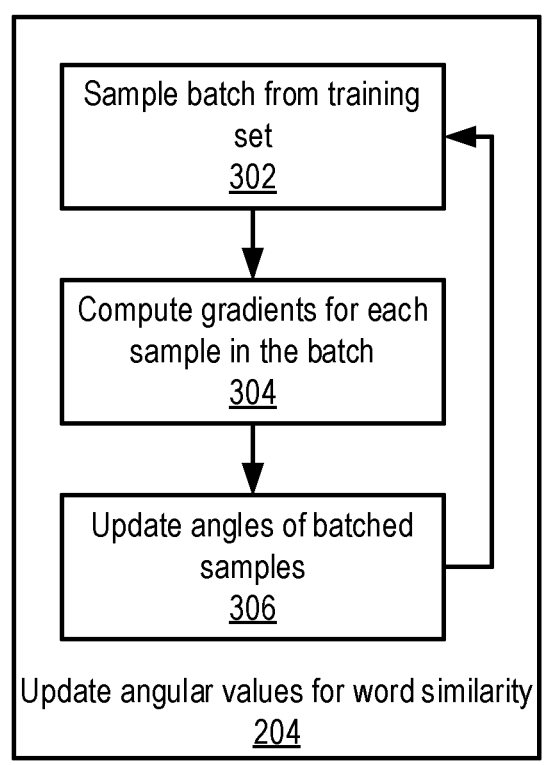
FIG. 3 is a block/flow diagram of a method of updating angular values for a word representation in polar coordinates in a Euclidean space, in accordance with an embodiment of the present invention.

Referring now to FIG. 3, additional detail on the update of angular values in block 204 is shown. Block 302 samples a batch from the set of training data. The batch may have any appropriate number of samples, and in some examples the batch size may range between 32 and 1024 words, but it should be understood that a batch size above or below this range, including a batch size of 1, would also be effective. In some embodiments, "positive" samples can be selected, where such samples are represented as edges in an input graph that connect two different entities (e.g., words). In some embodiments, "negative" samples can also be selected, which are pairs of entities that are selected at random, and may or may not be connected by an edge. The use of the Welsch loss function prevents negative samples from moving to the poles, because negative samples could otherwise have a large gradient, even for words that are already positioned far from one another.

Block 304 then computes gradients for each word that is sample in the batch, for example using the Welsch loss function as described above. These gradients indicate a direction of change for the words along the angular dimensions. Block 306 then iteratively updates the angular coordinates of the words in the batch. SVGD may be used to guide the updates in each iteration. SVGD is a deterministic, gradient-based sampling that minimizes the Kullback-Leibler divergence between a target distribution p and a trained distribution q. However, because SVGD tends to adjust the distribution to be uniform, the SVGD may be applied at specific iteration intervals, rather than in every iteration. Many iterations may be used to provide accurate results.

The kernelized Stein discrepancy, $S(\cdot,\cdot)$ may be maximized between a true posterior distribution $p(x)$ and an approximated posterior distribution $q(x)$, in a reproducing kernel Hilbert space $\mathcal{H}^d$:

$$S(q, p) = \max_{\Phi \in \mathcal{H}^d} \{\mathbb{E}_{x \sim q}[\mathcal{A}_p \phi(x)]\}$$

where $\mathcal{A}_p \phi(x) = \phi(x) \nabla_x \log(p(x)) + \nabla_x \phi(x)$. The following function in $\mathcal{H}^d$ provides an optimal solution for this variational problem:

$$\phi^*(x') = \mathbb{E}_{x \sim q}[k(x,x') \nabla_x \log(p(x')) + \nabla_x k(x,x')]$$

where k: $\chi \times \chi \to \mathbb{R}$ is a positive definite kernel, such as a radial basis function, which may be represented as $k(x, x') = e^{-\gamma \|x - x'\|^2}$. Thus, the Kullback-Leibler loss can be expressed by its relationship to the kernelized Stein divergence:

$$L_{KL} = \nabla_\in KL(q_\in \| p)|_{\in = 0} = -\mathbb{E}_{x \sim q}[\mathcal{A}_p \phi(x)]$$

where $\in$ is a perturbation and $q_\in$ is the perturbed density of the distribution x. This means that $\phi^*$ is an optimal perturbation direction that provides the largest descent of the KL divergence.

The updated angle $\hat{A}$ of a word can be determined from the Welsch gradient and the latest angle values A, where A and $\hat{A}$ include the angular components $\{\theta, \varphi_i\}$. The updated angles can be determined as $\hat{A} = -Ag$, where g is the gradient of the Welsch loss, described in greater detail above. Each of the words in the batch can be updated in this fashion. It should be noted that the values of the $\varphi_i$ angles are constrained to the range $\varphi_i \in (0, \pi)$, but that the gradient might attempt to move the values outside of that range. If this occurs for a particular angle, block 306 may not update that angle, and may instead keep the previous value.

Once each batch is completed, the next batch can be processed, until all of the words in the training data have been processed. In some embodiments, the next batch may have a completely random set of new samples. In some embodiments, the new samples may include at least some edges between new words and words that have already been updated, making it possible to orient the new samples in the context of the samples that have already been updated.

Figure 4:
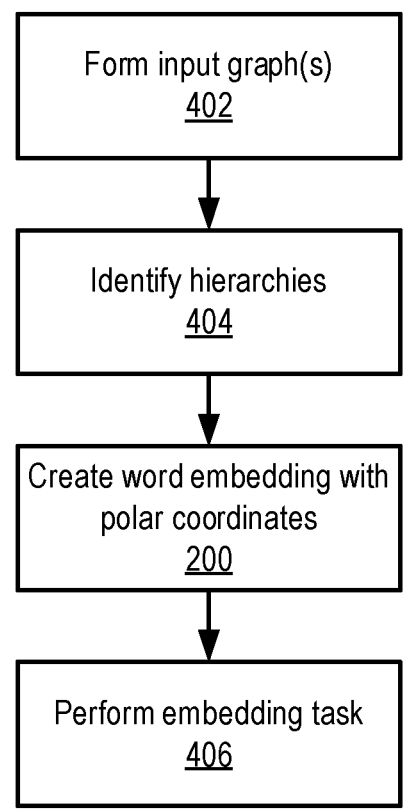
FIG. 4 is a block/flow diagram of a method that performs a task using word embeddings, based on representations in Euclidean space that use polar coordinates, in accordance with an embodiment of the present invention.

Referring now to FIG. 4, a method of performing a word embedding task is shown. Block 402 forms one or more input graphs, including some sort of semantic similarity between nodes in the input graphs, and including some expression of hierarchy. For example, the input graph may include a hierarchical taxonomy, or a knowledge base, with different concepts being represented as nodes within the graph, and with edges representing a hierarchical relationship between connected nodes. In some embodiments, these input graphs may be generated for a particular purpose. In some embodiments, standard knowledge graphs may be used as the input. As noted above, the use of word graphs are particularly contemplated, with edges representing hypernym/hyponym relationships, but it should be understood that the graph may encode any appropriate form of hierarchical and semantic data. Block 404 identifies the hierarchies that are encoded in the input graph(s). This may include determining a maximum height or depth of the input graph(s), and may further include identifying positions for each node in the input graph(s) relative to that maximum height or depth.

Block 200 uses the hierarchical and semantic information that is encoded in the input graph(s) to form a representation of the graph contents in a low-dimensional latent space, using polar coordinates. The details of block 200 are described above. Block 200 outputs a set of vectors within the low-dimensional space, where angular similarity between the vectors represents semantic similarity between the associated words/nodes, and where radial coordinates represent degrees of hierarchy.

Block 406 uses these embedded vector representations to perform some task. Exemplary tasks include, for example, link prediction in incomplete graphs, used to identify whether two nodes in an incomplete graph should be connected by an edge. For example, if a radial difference between the two nodes exceeds a first threshold, and if a cosine similarity of the two nodes falls below a second threshold, then a link may be inferred. The use of a polar embedding in such tasks produces superior results, as compared to Euclidean and hyperbolic models.

Another exemplary task is classification. For example, a classification task may include determining whether a given mammal is dangerous or not. Using an input graph of mammal terms, labeled according to a degree of damage, hierarchical information can be used to identify groups of mammals that are dangerous, in contrast to groups that are not. For example, leopards, jaguars, tigers, and lions are all in the genus panthera, and would all be labeled as being dangerous. If a new mammal is identified as being similar to these other animals, block 406 could identify it as belonging to a dangerous group, and classify it accordingly. The use of polar embeddings in Euclidean space make it possible to use simple, linear classifiers, rather than classifiers that focus on more exotic geometries.

In another exemplary task, the hierarchical embeddings can be used to facilitate word choice for generative text systems. For example, words can be grouped according to a set of criteria, and may include words that should be excluded from generated text. These words may be grouped together under an "excluded" hypernym, making it easy to determine what words are appropriate for the output text.

In another exemplary task, the hierarchical embeddings can be used to improve the output of a question answering system. For example, if a user asks whether kittens have claws, the knowledge base may have information that indicates that cats have claws, but may not specify that information for kittens as well. By using the hierarchical embeddings of these terms, the question answering system can discover that kittens are a kind of cat, and thus answer the question based on this hierarchical relationship.

In natural language tasks, where there may be a need to identify how similar two expressions are to one another, a vector embedding may be used to identify similarity using any appropriate metric, such as the cosine similarity. Because similar words will have similar angular values in their respective vector representations, the spatial relationships of the vectors can be used to determine whether two words have similar meanings. Furthermore, because hierarchical relationships are encoded in the radial values of the vectors, classifiers that are trained on such representations can be used to discern hypernym/hyponym relationships in the natural language task as well.

Because of the hierarchy-sensitive nature of these applications, embeddings that capture hierarchical relationships boost performance across the board, relative to embeddings that do not capture hierarchies. Furthermore, because the polar embeddings may be expressed in relatively few dimensions, they use fewer computational resources than normal word embeddings, which may generally have 50-300 dimensions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 5:
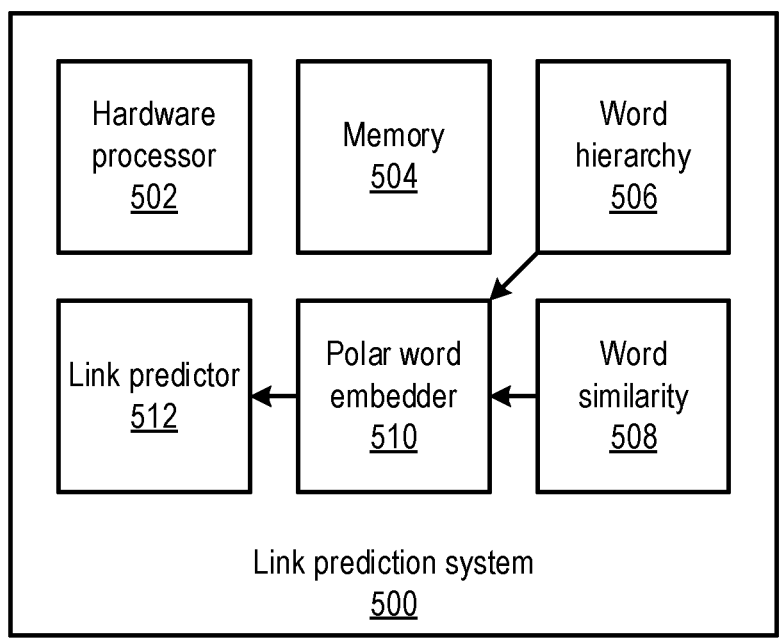
FIG. 5 is a block diagram of a link prediction system, as an example of a system that performs a word embedding task using representations in Euclidean space with polar coordinates, in accordance with an embodiment of the present invention.

Referring now to FIG. 5, a link prediction system 500 is shown. The system includes a hardware processor 502 and a memory 504. The memory 504 may store computer program code that, when executed by the hardware processor 502, may perform a variety of functions. The memory 504 may also store information relating to word relationships. For example, the memory 504 may include word hierarchy information 506, which may include databases of terms and their hierarchical relations, for example in the form of, "X is a kind of Y." The memory 504 may also include word similarity information, which may include databases that encode semantic information, such that words having similar meaning can be identified.

A polar word embedder 510 uses the word hierarchy information 506 and the word similarity information 508 to translate words into a low-dimensional Euclidean space in polar coordinates. As described above, the polar word embedder 510 may produce a relatively uniform distribution of word vectors within the space. The embedding may then be used by a link predictor 512 to determine whether an edge exists between two nodes in an input graph. Classification of links can be performed, for example, using a scoring function that is set for each model. Although link prediction is specifically contemplated, it should be understood that any appropriate classification task could be performed instead, using the polar word embeddings to capture both semantic and hierarchical relationships.

Figure 6:
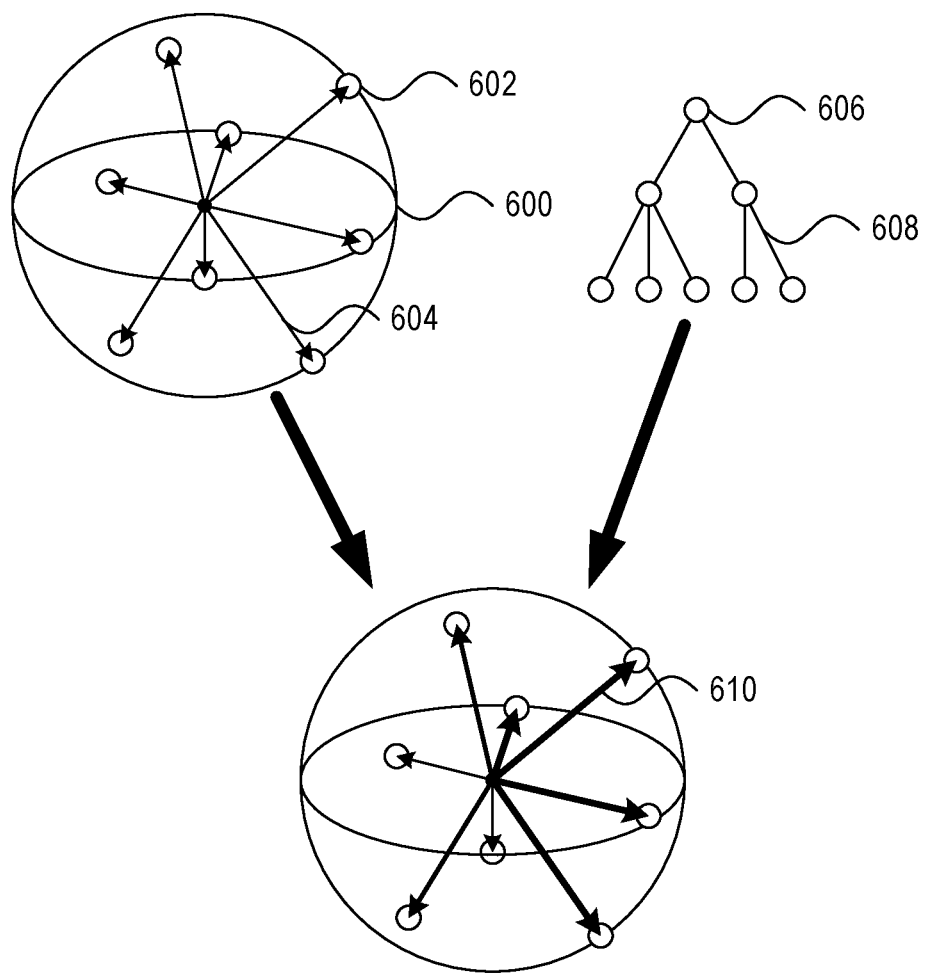
FIG. 6 is a diagram illustrating how angular similarity information and radial hierarchy information combine to form a polar word embedding, in accordance with an embodiment of the present invention.

Referring now to FIG. 6, an overview of the formation of polar word embedding representations is shown. A low-dimensional Euclidean space 600 is established with polar coordinates, including a radius and one or more angular components. The space 600 may have any appropriate dimensionality, with numbers of dimensions between 2 and 10 being specifically contemplated. The first angular component may be represented as $\theta=[0,2\pi)$, while each additional angular component may be represented as $\varphi=(0, \pi)$.

A set of initial angular embedding vectors 604 can be determined for a set of word entities 602. The word entities are embedded in the space 600 according to their semantic similarity to one another, with words that are more similar being grouped closer to one another than words that are dissimilar. These initial angular embedding vectors 604 may be determined without regard to word hierarchy, and so may all have an arbitrary radius value (e.g., 1).

A word hierarchy graph 606 provides hypernym/hyponym relationships 608. These relationships may be set by a subject matter expert, or may be mined from a language corpus. Each relationship may be expressed, for example, as, "X is a kind of Y," or any other appropriate specification of a relationship between a first word X and a second word Y. The word hierarchy graph 606 may be formed as a directed, acyclic graph, for example in the form of a tree, with a root node that represents a most general term, and with each child node representing a greater degree of specificity than its parent node.

The hierarchy information from the word hierarchy graph 606 can then be used to set the radius of each of the embedding vectors 604, producing hierarchical embedding vectors 610. The radius value is shown graphically, with bolder lines corresponding to larger radii. For example, the depth of a given word entity 602 on the word hierarch graph 606 may correspond the size of the radius value of the corresponding hierarchical embedding vector 610. The radius may be determined by determining the maximum depth of the word hierarchy graph 606, and multiplying a maximum radius value by a ratio of a word entity's depth to the maximum depth.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for performing a language processing task, comprising:

setting an angular coordinate for a vector representation of each word of a plurality of words, based on similarity of the plurality of words to one another, using a loss function that prevents words from being clustered at a pole of a space;

setting a radial coordinate for the vector representation of each word in the plurality of words, according to hierarchical relationships between the words; and performing a language processing task based on hierarchical word relationships using the vector representations of the plurality of words.

2. The method of claim 1, wherein the loss function includes a Welsch loss term.

3. The method of claim 2, wherein the loss function further includes a Kullback-Leibler divergence.

4. The method of claim 1, wherein the hierarchical relationships include hypernym/hyponym relationships between words.

5. The method of claim 1, wherein setting the angular coordinate for the vector representation includes iteratively updating the angular coordinate using a gradient descent.

6. The method of claim 5, wherein iteratively updating the angular coordinate includes using a Stein variational gradient descent at intervals, such that the gradient descent is not performed at every iteration.

7. The method of claim 1, wherein setting the angular coordinate for the vector representation includes setting a first angular coordinate to a value in the range $[0,2\pi)$ and setting at least one second angular coordinate to a value in the range $(0,\pi)$.

8. The method of claim 1, wherein the angular coordinate and the radial coordinate are set in a Euclidean space.

9. The method of claim 8, wherein the Euclidean space has a dimensionality of 2 or 3.

10. A non-transitory computer readable storage medium comprising a computer readable program for performing a language processing task, wherein the computer readable program when executed on a computer causes the computer to:

set an angular coordinate for a vector representation of each word of a plurality of words, based on similarity of the plurality of words to one another, using a loss function that prevents words from being clustered at a pole of a space;

set a radial coordinate for the vector representation of each word in the plurality of words, according to hierarchical relationships between the words; and perform a language processing task based on hierarchical word relationships using the vector representations of the plurality of words.

11. A system for performing a language processing task, comprising:

a hardware processor; and a memory, configured to store a computer program product that, when executed by the hardware processor implements:

polar word embedding code that sets an angular coordinate for a vector representation of each word of a plurality of words, based on similarity of the plurality of words to one another, using a loss function that prevents words from being clustered at a pole of a space, and to set a radial coordinate for the vector representation of each word in the plurality of words, according to hierarchical relationships between the words; and a language processing task based on hierarchical word relationships using the vector representations of the plurality of words.

12. The system of claim 11, wherein the loss function includes a Welsch loss term.

13. The system of claim 12, wherein the loss function further includes a Kullback-Leibler divergence.

14. The system of claim 11, wherein the hierarchical relationships include hypernym/hyponym relationships between words.

15. The system of claim 11, wherein the polar word embedding code further iteratively updates the angular coordinate using a gradient descent.

16. The system of claim 15, wherein the polar word embedding code further uses a Stein variational gradient descent at intervals, such that the gradient descent is not performed at every iteration.

17. The system of claim 11, wherein the polar word embedding code further sets a first angular coordinate to a value in the range $[0,2\pi)$ and to set at least one second angular coordinate to a value in the range $(0,\pi)$.

18. The system of claim 11, wherein the angular coordinate and the radial coordinate are set in a Euclidean space that has a dimensionality of 2 or 3.

\* \* \* \* \*